United States Patent [19]

O'Sullivan

[11] 4,176,021

[45] Nov. 27, 1979

[54] FABRICATION OF ALKALINE BATTERIES

[75] Inventor: Thomas D. O'Sullivan, Summit, N.J.

[73] Assignee: Bell Telephone Laboratories, Incorporated, Murray Hill, N.J.

[21] Appl. No.: 973,712

[22] Filed: Dec. 27, 1978

[51] Int. Cl.$^2$ .............................. C25B 1/00; C25C 7/02
[52] U.S. Cl. .................................. 204/96; 204/290 R
[58] Field of Search ............................. 204/96, 290 R

[56] References Cited

U.S. PATENT DOCUMENTS

| | | | |
|---|---|---|---|
| 3,214,355 | 10/1965 | Kandler | 204/56 |
| 3,573,101 | 3/1971 | Beauchamp | 136/76 |
| 3,653,967 | 4/1972 | Beauchamp | 136/75 |
| 3,979,223 | 9/1976 | Kroger et al. | 204/96 |

*Primary Examiner*—R. L. Andrews
*Attorney, Agent, or Firm*—Walter G. Nilsen

[57] ABSTRACT

A process is described for loading nickel electrodes in porous plaques using an electrolytic technique. The process involves use of a counter electrolyte covered with a cobalt compound. This process is highly efficient because less hydrogen ions are liberated during the impregnation process and less buffering substance is needed to stabilize the pH of the solution.

12 Claims, No Drawings

FABRICATION OF ALKALINE BATTERIES

TECHNICAL FIELD

The invention involves a process for fabricating alkaline batteries. In particular, it involves production of nickel electrodes for alkaline batteries by electrolytic impregnation.

BACKGROUND OF THE INVENTION

Alkaline batteries (particularly nickel-cadmium batteries) have assumed increasing importance in commercial markets both for home appliances and in many industrial applications. Desirable properties of alkaline batteries are high capacity per unit weight, high charge and discharge rates and long shelf life. Rechargeable home appliances are becoming more and more evident in the marketplace. Methods of manufacture have emphasized not only increased energy storage per unit weight but also increased charge and discharge rates. Aside from nickel-cadmium batteries, nickel electrodes are also useful in other alkaline batteries such as nickel-hydrogen batteries, nickel-zinc batteries and nickel-iron batteries.

A commercially established procedure for fabricating nickel electrodes for alkaline batteries is to impregnate a porous supporting electrode structure (i.e., a porous nickel plaque) with finely divided active material so as to present a high surface area of active material to the battery electrolyte. While loadings obtained in this fashion are quite satisfactory, higher loadings are desirable and reduced time for loading is economically advantageous. In addition, it is desirable to formulate procedures which result in more rapid and more efficient commercial production of these electrodes.

A number of impregnating procedures have been used in the past. Particularly simple is the procedure of soaking the porous plaque in a salt solution and evaporating the liquid. This step is followed by soaking the plaque in a second solution to convert the soluble salt to an insoluble active form. Soaking in either the first or second solution, or both, might be repeated several times to increase loading. Thermal decomposition is also used to convert the salt into an insoluble active form. These procedures are generally referred to as chemical impregnation processes.

An alternative approach over the soaking processes is electrolytic impregnation (see L. Kandler, U.S. Pat. No. 3,314,355 issued Oct. 26, 1965). In this process, active material is continuously deposited directly in the pores of the plaque. Here the impregnation is carried out in an acid electrolyte containing cations of the active material. In the electrolysis process, the nickel plaque is made the cathode, and the cations of the active material as well as reducible ions (for example, nitrate ions) migrate into the pores of the plaque. Only the reducible ions are reduced at the cathode (in the plaque) because of their more positive potential. During this electrolytic reduction, hydrogen ions are consumed making the region inside the plaque more basic. This results in precipitation of the cations in the form of active material. This method is a further improvement on previous methods and is more adaptable to mass production.

Loading levels are increased somewhat by repeated electrolytic impregnation and overnight drying between each impregnation. However, this process modification increases manufacturing time. More rapid impregnation is achieved by increasing the temperature of the electrolyte, as described in R. L. Beauchamp, U.S. Pat. Nos. 3,573,101 issued Mar. 30, 1971 and 3,653,967 issued Apr. 4, 1972. However, even more rapid impregnation than achieved up to the present time is highly desirable, especially where a continuous impregnation procedure is used in the commercial production of electrodes. Attempts to increase loading rates by increasing the electrolytic current result in the production of a hard crust of active material on the outer portion of the nickel plaque which does not contribute to the capacity of the battery and prevents impregnation in the pores of the nickel plaque. This results in low load levels.

SUMMARY OF THE INVENTION

The invention is a process for making nickel electrodes particularly useful for alkaline batteries by an electrolytic loading procedure in which the counter electrodes or anodes in the loading procedure are coated with a substance containing cobalt compound. This cobalt compound is best described as an hydrated oxide or hydroxide and forms a coating on the outside of the counter electrode structure. The counter electrode is best made by an electrolysis process in which the counter electrode is made the anode and the electrolyte contains a soluble cobalt salt such as cobalt nitrate [e.g., $Co(NO_3)_2$]. Electrolytic loading of nickel electrodes with cobalt coated counter electrodes is advantageous for several reasons. First, less hydrogen ions are produced in the loading process which makes the loading process easier to control. Excessive acidity is detrimental to the nickel plaque and prevents precipitation of the active material in the plaque electrode. Second, it leads to increased lifetime of the impregnation bath because less buffer solution (such as sodium nitrite) need be added to control acidity. Added salts eventually cause the efficiency of the bath to decrease.

DETAILED DESCRIPTION

1. Preparation of the Counter Electrode

The advance lies largely in the use of a special type of counter electrode in the electrolytic impregnation process. This counter electrode is prepared by an electrolysis process in a bath containing soluble cobalt salts. The counter electrode structure can be made of any material that is reasonably conductive and is chemically inert to the conditions of manufacture and the conditions of impregnating nickel electrodes. Generally, this involves exposure to highly acidic aqueous solutions at high temperatures. Platinum or palladium is often used as well as titanium. Particularly attractive is platinized titanium in which the surface of a titanium electrode is coated with platinum metal. Ruthenium oxide may also be used over the titanium. Various shapes may be used including screens, etc.

A variety of soluble cobalt salts may be used in the electrolysis bath. Cobalt nitrate is particularly convenient for several reasons. Firstly, the nitrate is reduced at the cathode in preference to the cobalt ion which reduces usage of cobalt and makes it easier to control the concentration of cobalt in the solution. Secondly, cobalt nitrate is highly soluble so that a wide range of concentrations may be used. Thirdly, it is quite stable and nonvolatile so that high solution temperature including boiling solutions can be used in the preparation of the counter electrode. The concentration range of the cobalt solution is not critical, but the range from 0.1 molar to saturation is preferred. Below 0.1 molar, the reaction rate is sometimes inconveniently slow. The concentration range between 0.5 molar and 4 molar is most often used because it yields reasonable rates without being wasteful of material.

The electrolysis process is carried out by passing current through the solution, counter electrode (as anode) and an inert cathode. The structure and composition of the cathode is not critical. Preferably, it should be inert such a platinum, palladium or titanium. A sintered nickel plaque is often used.

The current density used is not critical. A range of current densities from 0.1 to 5.0 Amperes per square inch of geometrical area is preferred since it gives reasonable rates without excessive overvoltages and heat production. Impregnation times from 20 minutes to 4 hours are preferred so as to produce sufficient material without being wasteful of time. Typically, 40 minutes at 0.5 Amperes per square inch is used. The cobalt coated counter electrode may be used as is, or is usually washed with distilled water and then used.

The process may be carried out at any temperature between the freezing point and boiling point of the electrolyte. Higher temperatures, usually between 80 degrees C and boiling are preferred because of higher rates of reaction. A boiling electrolyte is most preferred because of higher reaction rate and the agitation provided by the boiling.

2. Nature of the Cobalt Coating

The cobalt coating is composed of cobalt ion, oxygen and hydrogen in the form of a hydroxide, oxide-hydroxide or hydrated oxide. The oxygen and hydrogen is chemically bonded to cobalt and each other. The cobalt, when separated from excessive water, has 50–60 weight percent ($56\pm2$ weight percent) cobalt and has a molecular weight between 100 and 110. The coating is amorphous in that it does not yield an X-ray powder pattern. The coating is fairly conductive in that it does not significantly increase the voltage necessary to achieve a given impregnation rate in the electrolytic loading process. Although best results are obtained where the entire surface is coated with cobalt compound, as little as one percent coverage yields improved results.

3. The Impregnation Process

The impregnation of the nickel electrode is carried out by conventional means as set forth in various references including L. Kandler, U.S. Pat. No. 3,214,355 issued Oct. 26, 1965; R. L. Beauchamp, U.S. Pat. No. 3,573,101 issued Mar. 30, 1971; and R. L. Beauchamp, U.S. Pat. No. 3,653,967 issued Apr. 4, 1972. The nickel plaque is impregnated in an acidic nickel solution. The plaque is made the cathode, and the cobalt coated electrode is made the anode.

Generally, the nickel in the electrolyte is added as nickel nitrate, but other anions may be used provided they are reduced more easily than the nickel ions. Although concentrations may vary over large limits, (say from 0.1 M to saturation), optimum conditions are contained in a range from 1.5–3.0 molar. Small amounts of soluble cobalt compound (usually cobalt nitrate) are added to introduce cobalt into the nickel electrode. This improves cycle like. Generally, the amount of cobalt added varies from 1 to 30 mole percent of the nickel concentration. A range of 5 to 10 mole percent is preferred. The pH should be in a range from 0.5–5.0 with the range from 1.0 to 3.5 preferred. Preferred impregnation rates are from 0.05–5 Amperes per square inch.

These ranges give optimum loadings without being wasteful of time.

Because hydrogen ions are liberated during the impregnation process, some means should be used to prevent excessive acidity of the solution. This may be done in a variety of ways, including the addition of basic substances. Because regions of excessive basicity should be avoided, pH is often controlled by the addition of alkalai metal nitrites. This procedure has the advantage of controlling basicity without producing regions of excessively high pH. Best results are obtained with initial concentrations of nitrite between 0.1 M and saturation.

4. Results

The advantage of the cobalt coated counter electrode is best demonstrated by a measurement of a concentration of nitrite after a given amount of impregnation. For comparison, the measurement is compared with the same process carried out with an ordinary counter electrode. Two comparisons were made. The first comparison, the electrolyte solution, contains approximately 0.1 M cobalt ions and 2.0 M nickel ions. This procedure leads to an electrode loading of approximately five mole percent cobalt remainder nickel. The impregnation rate was 0.5 Amperes per square inch. Initially, the nitrite concentration was 0.27 molar and the pH was about 3. After 20 minutes of electrolyte impregnation, the process without cobalt coated counter electrode had a nitrite concentration of 0.07 molar, whereas the process with cobalt coated counter electrode had a nitrite concentration of 0.09 molar. The remaining concentrations as the impregnation process went on, are given in Table 1.

Table 1

| Time (min) | Nitrate Concentration (Molarity) | |
|---|---|---|
| | With Co Coated Counter electrode | Without Co Coated Counter electrode |
| 0 | 0.264 | 0.264 |
| 20 | .092 | 0.070 |
| 40 | .040 | 0.01 |
| 60 | .017 | 0.001 |
| 80 | .006 | 0 |
| 120 | .004 | 0 |

In another impregnation experiment, in which no cobalt was contained in the electrolyte solution, the results were equally dramatic, in that more nitrite was used where the counter electrode was not coated in accordance with the invention. The initial concentration of nickel was 2 Molar and the initial pH was approximately 3. The current density was 0.5 Amperes per square inch. These results are shown in Table 2 below:

Table 2

| Time (Min) | Nitrite Concentration (Molarity) Concentration (Molar) | |
|---|---|---|
| | With Co Coated Counter Electrode | Without Co Coated Counter Electrode |
| 0 | 0.241 | 0.288 |
| 14 | 0.171 | 0.151 |
| 20 | 0.162 | 0.133 |
| 36 | 0.098 | 0.069 |
| 51 | 0.077 | 0.033 |
| 65 | 0.046 | 0.010 |
| 80 | 0.025 | 0.004 |

These results show the overwhelming advantage of using a cobalt coated electrode in accordance with the invention. The procedure is more stable, requires less buffer to stabilize pH and is less expensive to run. It should be emphasized that the lifetime of the electrolyte solution depends on the amount of buffer solution (in this case, alkalai metal nitrite) that is added to the solution.

We claim:

1. A process for producing alkaline batteries with nickel electrodes in which the nickel electrodes are made by electrolytic loading of a porous structure including the step of passing current through the porous structure, an aqueous electrolyte comprising nickel ions, and a counter electrode characterized in that the counter electrode is at least partially coated with a substance comprising cobalt compound with 50-60 weight percent cobalt.

2. The process of claim 1 in which the electrolyte loading is carried out with a current density in the range from 0.05-5.0 Amperes per square inch, for a time period of 20 minutes to 4 hours and an electrolyte temperature from 80 degrees C. to boiling.

3. The process of claim 2 in which the initial concentration of nickel ions is from 0.1 M to saturation and the initial pH is from 0.5 to 5.0.

4. The process of claim 3 in which the electrolyte initially comprises nitrate ions to control pH in the concentration range from 0.1 M to saturation.

5. The process of claim 1 in which the remainder of the cobalt compound comprises oxygen and hydrogen chemically bonded to cobalt.

6. The process of claim 5 in which the weight percent cobalt in the cobalt compound is 56±2.

7. The process of claim 1 in which the aqueous electrolyte comprises nickel and cobalt ions with cobalt ion concentration between 1 and 30 mole percent of the nickel ion concentration.

8. A process for producing alkaline batteries with nickel electrodes in which the nickel electrodes are made by electrolytic loading of a porous structure including the step of passing current through the porous structure, an aqueous electrolyte comprising nickel ions and a counter electrode characterized in that the counter electrode is at least partially coated with a substance comprising cobalt compound made by an electrolytic process including the step of passing current through the counter electrode, an aqueous bath comprising soluble cobalt ions and an inert anode.

9. The process of claim 8 in which the aqueous bath contains cobalt nitrate in the concentration range from 0.1 M to saturation.

10. The process of claim 9 in which the concentration range of cobalt nitrate is from 0.5 molar to 4 molar.

11. The process of claim 10 in which the process for preparing the counter electrode is carried out at a current density of from 0.1-5.0 Amperes per square inch.

12. The process of claim 11 in which the process for preparing the counter electrode is carried out at a temperature ranging from 80 degrees C. to boiling.

* * * * *